United States Patent [19]
Kendall

[11] 4,417,738
[45] Nov. 29, 1983

[54] RETRACTABLE CASTER ASSEMBLY HAVING A LEVER IN ROLLING ENGAGEMENT WITH A PRESSURE PLATE

[75] Inventor: Ray Kendall, Fort Worth, Tex.

[73] Assignee: Dynalectron Corporation, McLean, Va.

[21] Appl. No.: 218,826

[22] Filed: Dec. 22, 1980

[51] Int. Cl.³ .............................................. B60B 33/06
[52] U.S. Cl. ................................. 280/43.17; 16/34; 280/43.24
[58] Field of Search ................... 16/32, 34, DIG. 39; 280/43, 43.17, 79.1 R, 43.24; 414/608

[56] References Cited

U.S. PATENT DOCUMENTS

| 554,359 | 2/1896 | Breed . | |
|---|---|---|---|
| 2,461,479 | 2/1949 | Moffat . | |
| 2,827,302 | 3/1958 | Skyrud | 280/33.99 T |
| 3,250,513 | 5/1966 | Fenner et al. | 280/43.17 X |
| 3,514,001 | 5/1970 | DeMeritt et al. . | |
| 4,027,771 | 6/1977 | Adams . | |
| 4,105,218 | 8/1978 | Newell | 280/43.17 X |
| 4,213,624 | 7/1980 | Sanders | 280/43.17 X |

FOREIGN PATENT DOCUMENTS

| 518468 | 5/1928 | Fed. Rep. of Germany ... 280/43.17 |
|---|---|---|
| 1032859 | 7/1953 | France ............................. 280/43.17 |

Primary Examiner—Fred Silverberg
Attorney, Agent, or Firm—Finnegan, Henderson, Farabow, Garrett & Dunner

[57] ABSTRACT

A retractable caster assembly for permanent attachment to a framework. The caster assembly, when retracted, allows the framework to rest on a surface in a first stable position and when extended, the assembly raises the framework above the surface in a second stable position. The caster assembly comprises a caster, a caster carrying structure, a structure for pivotably mounting the caster carrying structure to the framework and a lever pivotably mounted to the framework for engagement with the caster carrying structure to lower the caster into engagement with the surface in one stable position and raise the center so the lower periphery of the caster is above the lower surface of the framework in another stable position of the assembly.

8 Claims, 4 Drawing Figures

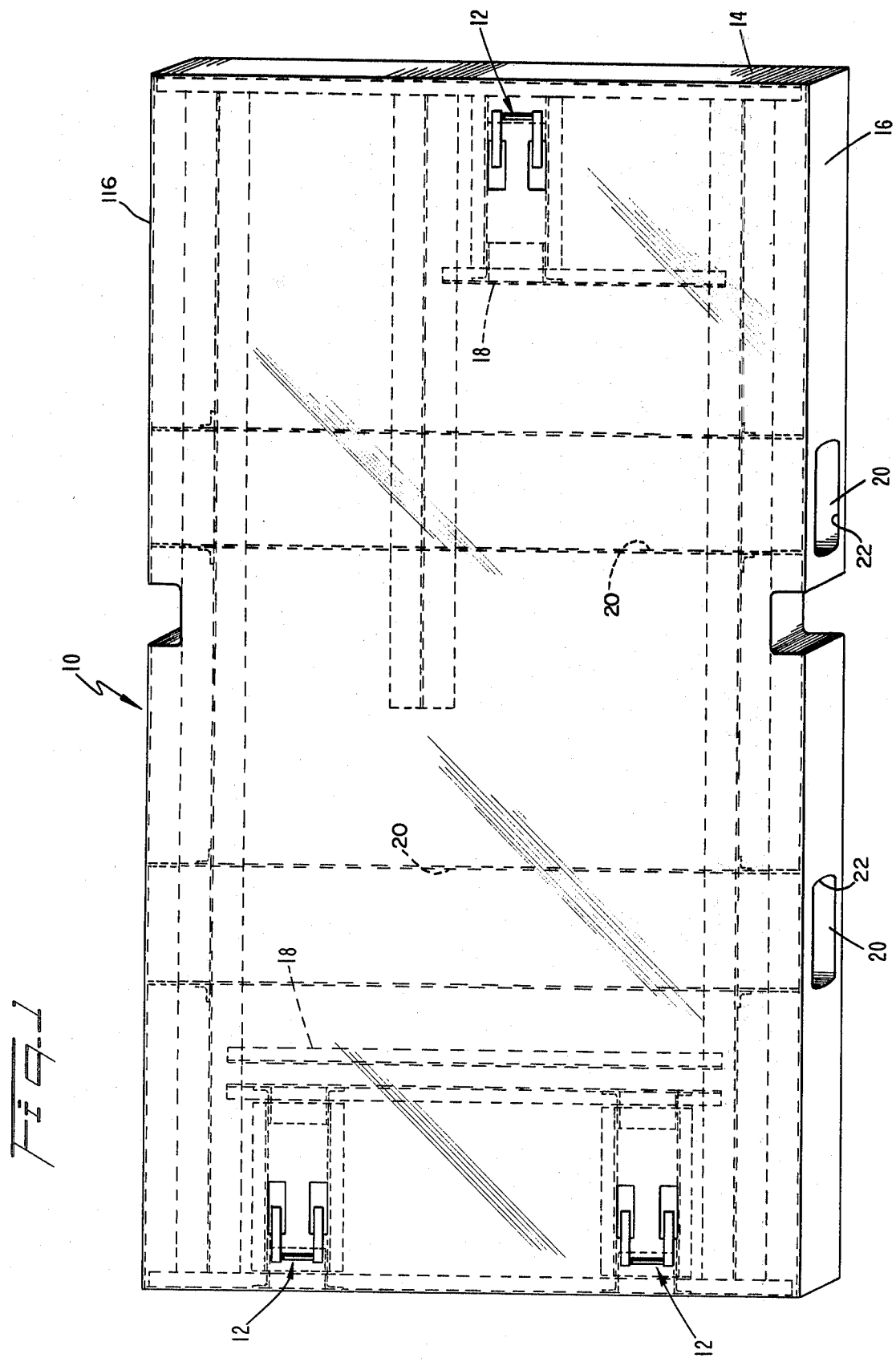

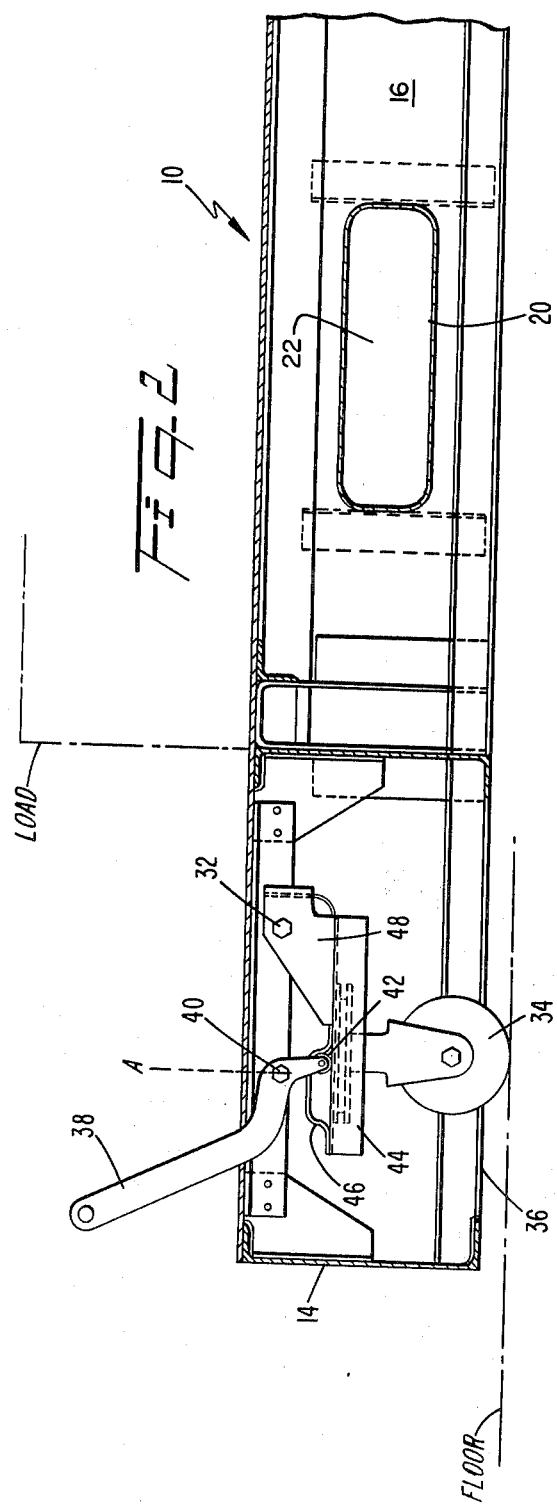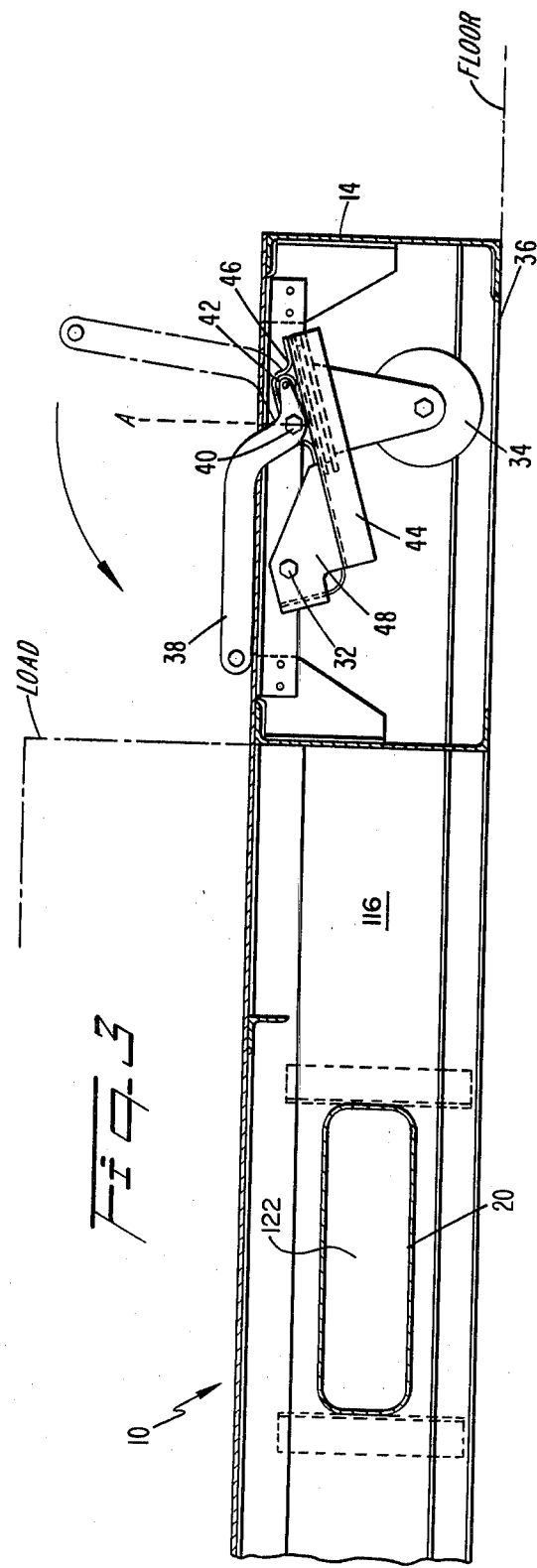

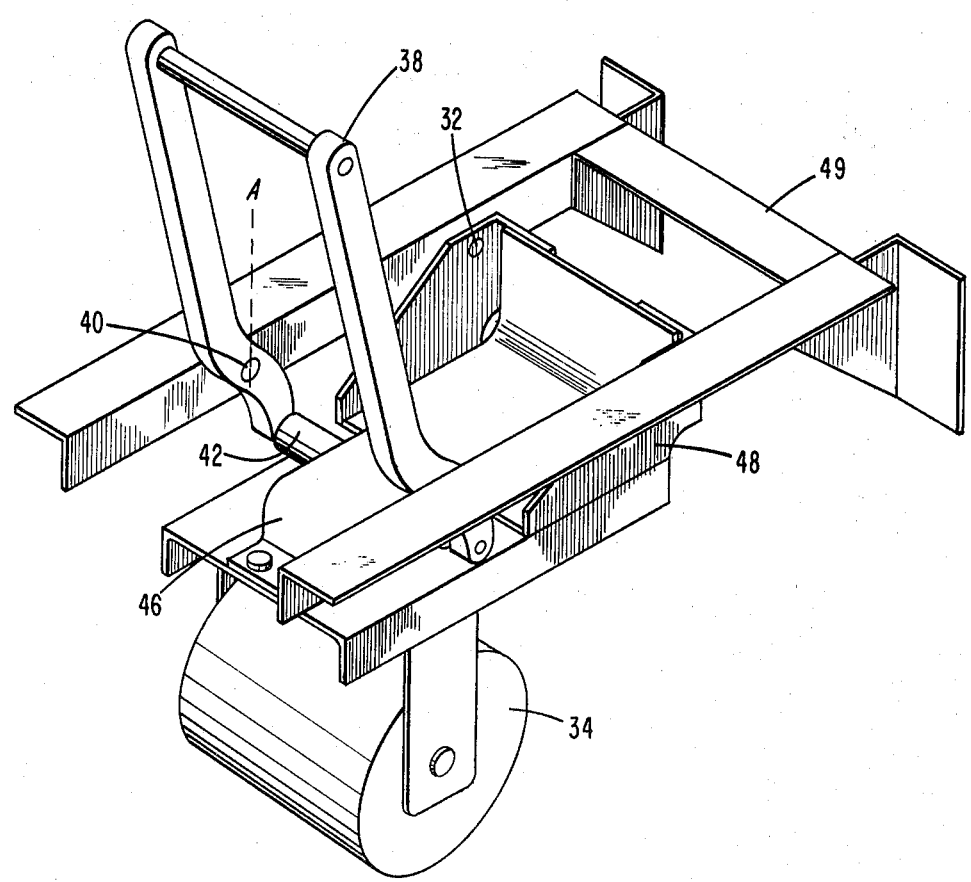

RETRACTABLE CASTER ASSEMBLY HAVING A LEVER IN ROLLING ENGAGEMENT WITH A PRESSURE PLATE

BACKGROUND OF THE INVENTION

The present invention relates to a retractable caster assembly which can be used to support a framework, such as as a pallet, on casters. Such an assembly is useful in providing a degree of mobility to loaded pallets which enable them to be shifted about in relatively small areas that would be inaccessible to a normal forklift truck.

It is well-known in the art to use pallets to transport or store materials. However, the maneuvering of pallets presents difficulties when inside of vehicles such as airplanes or trucks, which are either inaccessible to, or do not have a large area for normal forklift trucks. Thus, in positioning loaded pallets inside of vehicles, it has often been necessary to first place the loaded pallet into the vehicle by use of a forklift truck and then to separately attach small handtrucks or carriers to the pallet in order to raise the pallet and move it to the desired position within the vehicle. Such small trucks or carriers are cumbersome to carry about and take some time to affix to pallets.

One area of special interest is the loading of delicate scientific testing equipment onto airplanes. Due to the weight and nature of the equipment, it is necessary to use some type of device to transport and position the equipment inside of the airplane. At the same time, care must be taken to move the equipment with a minimum of disturbance into areas which are inaccessible in most aircraft to large forklift trucks. p In order to provide for the movement of such loads within aircraft, I have invented a retractable caster assembly and a pallet using such an assembly. The pallet may be moved by a forklift truck or by lowering the retractable caster assemblies, and thus lifting the pallet, so that the pallet can be maneuvered easily by a person on the extended casters of the assemblies. By making the caster assemblies in such a way that they are integral with the pallet, the nuisance of attaching separate pallet trucks or carriers, each of which must be affixed and adjusted separately to a pallet in order to support it and make it moveable, is eliminated. In addition, the invention offers a large mechanical advantage for raising a loaded pallet from a surface onto the casters of the assemblies. The mechanism for lowering and raising the casters also provides a hand support for use in maneuvering the pallet about.

SUMMARY OF THE INVENTION

The present invention overcomes the problems and disadvantages of the prior art by providing a caster assembly integral with a framework such as a pallet, for use in maneuvering the framework. The invention may be used whether the framework is in a loaded or unloaded condition and eliminates the need for large forklift trucks or individual small trucks or carriers which are individually affixed to a framework for use in the close maneuvering of the pallet. Thus, a load can be secured onto the surface of the framework, such as a pallet, and the pallet can be transported either by a forklift truck to its desired location or, by use of the invention, it can be moved by lowering the caster assemblies and pushing or pulling the pallet to its desired location and then retracting the caster assemblies so that the bottom of the pallet rests on the surface at the intended position.

To achieve the objects and in accordance with the purpose of the invention, as embodied and broadly described herein, the retractable caster assembly of this invention is attachable to a framework for allowing the framework to rest on a surface in a first stable position of the assembly and for lowering the assembly and thereby raising at least one end of the framework off the surface on at least one caster and comprises a caster, a caster carrying means, means for pivotally mounting the caster carrying means to the framework at a pivot point located such that the caster may extend below the lower surface of the framework in a second stable position of the assembly and lever means pivotably mounted to the framework and engageable with the caster carrying means for lowering the caster carrying means and the caster from the first stable position where the lower periphery of the caster is entirely within the framework to the second position where one end of the framework is supported above the caster in a second stable position of the assembly.

Broadly, a pallet incorporating this invention has at least a pair of retractable caster assemblies for supporting the pallet in a stable position above a surface on the casters of the assemblies. The pallet framework has an upper and a lower surface, the pair of caster assemblies are pivotally mounted to the framework and have means to extend the casters below the lower surface of the pallet to support the framework and to retract the casters to a position where they do not support the framework above the surface.

The caster of the retractable assembly is lowered into engagement with the surface on which a framework or pallet rests by a lever means having a fulcrum point affixed in the framework. The lever means has a handle portion above the fulcrum point and an engagement point below the fulcrum point. The engagement point is adjacent to a pressure plate fixed to the center carrying means of the assembly and this point presses against the pressure plate upon the raising of the handle portion of the lever means. A means is incorporated for restricting the travel of the lever means so that between the point where the lever means causes the caster to be fully lowered in one stable position and supporting at least a portion of the pallet and a point where the caster is in a fully raised position. The travel-restricting means may be a bracket fixed to the pressure plate about the engagement point to contain the engagement point and thereby allow travel of the handle from a lowered position substantially flat with the upper surface of the framework to a raised position, over center through the vertical line extending through the fulcrum point.

The accompanying drawings, which are incorporated in and constitute a part of this specification, illustrate an embodiment of the invention, and together with the description, serve to explain the principles of the invention.

BRIEF DESCRIPTION OF THE DRAWINGS

FIG. 1 is a perspective view of a pallet having three retractable caster assemblies and channels for the insertion of tangs of a forklift truck.

FIG. 2 is a side view of one retractable caster assembly mounted in a framework and having the caster lowered below the surface of the framework.

FIG. 3 is a perspective view of a retractable caster assembly mounted in a framework and having the caster in a raised position not lower than, the lower surface of the framework.

FIG. 4 is a perspective view of a wheeled assembly.

DESCRIPTION OF THE PREFERRED EMBODIMENT

Reference will now be made in detail to the present preferred embodiment of the invention, an example of which is illustrated in the accompanying drawings.

The preferred embodiment of the retractable caster assembly is shown in FIG. 2 in its extended mode and in FIG. 3 in its retracted mode. In the Figs. the assembly is shown attached to a framework. The assembly as used in a pallet is depicted in FIG. 1 wherein the pallet 10 has mounted within its framework three retractable caster assemblies 12. The pallet framework is composed of end members 14 and side members 16 and 116. Such a pallet may have, in addition, one or more cross members 18 extending either from one side member to another from one end member to another or between a cross member and end or side member. The pallet, as depicted, is in the form of a rectangle; however, a pallet using the caster assemblies of the invention may be in any desired shape provided they have a framework to which the caster assemblies may be attached. The pallet 10 also has channels 20 which run from one side member to the other and are positioned so that they will accomodate the tangs of a forklift truck. Such channels are useful to accurately and securely position the tangs of a forklift truck within the framework of the pallet.

The retractable caster assembly as shown in FIG. 2 is mounted to a framework, such as the framework of pallet 10. The assembly operates to raise the framework from a first stable position in which it is resting upon a surface to a second stable position in which the end of the framework where the caster assembly is located is supported above the surface on the caster of the assembly. In general, the extension and retraction of the caster is accomplished by a lever means which, when raised, extends the caster below the surface of the framework and, when lowered, retracts the lower periphery of the caster to a position above the lower surface of the framework.

Referring now to a more detailed description of the retractable caster assembly, as embodied herein, it comprises a pressure plate 44 to which a caster 34 is pivotally secured, a hinge plate 48 which is secured to the framework by a pivotal mounting such as a bolt and nut 32. The lower surface of the hinge plate 48 is secured to the pressure plate 44 in a fixed fashion. Alternatively, the hinge plate may be pivotally mounted to an independent frame 49 which is dimensioned to fit within the framework as is shown in FIG. 4.

The caster 34 is pivotably mounted on the lower surface of the pressure plate 44. The caster may be of various constructions known in the art; however, it should be capable of rotating in a full 360° arc. Such a caster is useful to provide a large range of maneuverability for the framework to which the retractable caster assemblies are incorporated.

In mounting the retractable assembly to a framework such as the framework of pallet 10, it is essential that it be positioned within the framework so that the caster 34 may extend below the lower surface 36 of the framework when the pressure plate 44 is in its lowered position.

In order that the caster assembly may be raised and lowered by the lever means, a hinge 48 is affixed to the upper surface of the plate 44 and pivots about a point 32 which secures it to the framework. Upon the lowering of the assembly, the caster 34 extends below the lower surface 36 of the framework and contacts the surface on which the pallet rests. On the retraction of the assembly, the lower periphery of wheel 34 is raised out of contact with the surface upon which the pallet is rests and is above the lower surface 36 of the framework.

As embodied herein, the lever means has a handle portion 38 located above a fulcrum point 40. The fulcrum point 40 may be mounted either on the independent bracket 49 or, where the framework has members positioned in appropriate locations, mounted on the framework. The lever means has an engagement point 42 which, as herein embodied, comprises a roller and is located below the fulcrum point 40 of the lever means. The lever means is operated to lower the pressure plate 44 and the caster 34 from a stable position as illustrated in FIG. 3 where the lower periphery of the caster 34 is not lower than the lower surface of the framework of pallet 10 to a second stable position where the end of the framework having the caster assembly is supported above the caster so that it may be moved about on the caster.

In accordance with the invention, by raising the handle portion 38 of the lever means from the surface of the pallet to a position slightly past the vertical line A extending through fulcrum point 40, the lever means pivots about point 40 and the engagement point 42 presses against pressure plate 44 and acts to lower the wheel 34 as the hinge plate 48 pivots about its mounting 32. The lever means operates more easily against pressure plate 44 if a friction reducing mechanism such as the roller 42 is secured in the engagement point at the lower end of the lever means. By operation of the lever means, the caster is lowered below the lower surface 36 of the pallet thus raising the pallet off the surface. The caster must be lowered to an extent that it is free to roll on the surface on which the pallet is resting and to rotate completely. The assembly is then in its second stable position. In this position, the handle 38 of the lever means has been raised through the vertical line A extending through the fulcrum point 40. By raising the handle, the engagement point of the lever positioned adjacent the pressure plate 44 presses against the upper surface of pressure plate 44 and moves from left to right as depicted in FIG. 2 while the handle portion 38 of the lever means moves in an arc from right to left. In order to restrict the travel of the lever means and the engagement point, a travel restricting bracket 46 is affixed to the upper surface of the pressure plate to contain the engagement point and thereby allow travel of the handle portion of the lever from a lowered portion which, as depicted in FIG. 3, is substantially flat with the upper surface of the framework to a raised position as depicted in FIG. 2 just past the vertical line A through the fulcrum point 40.

The framework for the pallet may be made of various materials, such as wood, metal, or plastic; however, it is useful in pallets constructed for use in airplanes to use materials which have high strength-to-weight ratios. For this purpose metal frameworks are normally used. The framework may also have attached to it a surface skin of metal or other material upon which a load may be secured. The pallet may be provided with tie-down points on the surface of the pallet or in the framework.

In addition, it is useful to have openings 22 in one side member 16 of the framework which register with openings 122 on the opposite side member 116 and positioned so that the tangs of a forklift truck will fit into the openings 22 or 122 and extend through channels 20 towards the opposite side member 16 or 116, respectively.

It will be apparent to those skilled in the art that various modifications and variations can be made in the retractable wheel assembly of the present invention without departing from the scope or spirit of the invention. Thus, it is intended that the present invention cover the modifications and variations of this invention provided they come within the scope of the appended claims and their equivalents.

What is claimed is:

1. A retractable caster assembly for permanent attachment to a framework for allowing said framework to rest on a floor surface in a first stable position of the assembly, and for lowering the assembly and thereby raising at least one end of the framework above said floor surface in a second stable position of the assembly, the assembly comprising:
   (a) a hinge plate pivotally mounted at one end to said framework;
   (b) a pressure plate affixed to said hinge plate at the opposite end of said hinge plate from said pivotal mounting;
   (c) a caster rotatably mounted on the lower surface of said pressure plate and said hinge plate positioned so that on lowering said assembly said caster extends below the lower surface of said framework and, on raising said assembly, the lower periphery of said caster is not lower than the lower surface of said framework and is out of contact with said floor surface;
   (d) a lever having a fulcrum point pivotably mounted on said framework, said lever having a handle portion above said fulcrum point and an engagement point below said fulcrum point, said engagement point including a roller rolling along and against the upper surface of said pressure plate to lower said caster upon raising said handle portion of said lever, said engagement point of said lever acting directly on said pressure plate through said roller; and
   (e) means mounted on the upper surface of said pressure plate for restricting the travel of said roller between a point where said caster is in a fully lowered stable position supporting at least a portion of said pallet wherein said fulcrum point, said roller and the center of said caster are in substantially vertical alignment, and a point where said caster is in a fully raised position.

2. The assembly of claim 1, wherein said handle portion is movable from a lowered position substantially flat with the upper surface of said framework when said caster is in the fully raised position to an over center raised position past the vertical line through said fulcrum point when the caster is in the fully lowered position.

3. A pallet having permanently affixed to said framework a plurality of retractable caster assemblies of claim 1.

4. The pallet of claim 3 wherein the pallet framework comprises side members and end members secured together to form a rectangle and one or more cross members secured between said side and end members.

5. The pallet of claim 4 wherein the pallet framework is made of metal.

6. The pallet of claim 4 wherein the pallet framework has secured to it a metal surface.

7. The pallet of claim 4 wherein the side members have openings spaced apart to admit the tangs of a forklift truck.

8. The pallet of claim 7 wherein said openings on one side member are connected to a registering opening on a second side member by channels corresponding in cross section to the shape of said openings.

* * * * *